Dec. 29, 1953 — H. RUDOLPH — 2,663,942

INSTRUMENT FOR MEASURING INSIDE DIMENSIONS

Filed Nov. 24, 1952

INVENTOR.
Hans Rudolph
BY
ATTORNEY.

Patented Dec. 29, 1953

2,663,942

UNITED STATES PATENT OFFICE 2,663,942

INSTRUMENT FOR MEASURING INSIDE DIMENSIONS

Hans Rudolph, Kansas City, Mo.

Application November 24, 1952, Serial No. 322,212

10 Claims. (Cl. 33—164)

This invention relates to high precision measuring instruments and more particularly to an instrument for taking inside measurements such as in holes, openings, grooves and the like, the primary object being to improve upon devices of this class so as to render the same more accurate, simpler to manufacture and use, as well as sturdy throughout.

It is the object of this invention to provide an inside gauge that includes a pair of novel gauge elements that are reciprocable toward and away from each other in a slideway and provided with improved means for holding the same yieldably biased toward each other with substantially equal tension.

Another improved object of this invention is to provide a gauge having the aforementioned gauge elements slidably interconnected through a novel joint to the end that the same will not become misaligned and will, therefore, remain accurate over long periods of continued and abusive use.

A further object hereof is to provide an inside gauge of the kind having a reciprocable, wedge-shaped cam for spreading the gauge elements, there being provided a special holder for the gauge elements having fingers provided with a slideway to maintain not only the gauge elements themselves, but the cam, in proper alignment and relationship at all times.

Other objects include the way in which the cam is reciprocated by means of a screw having an anvil thereon bearing against a spring-loaded cam; the manner of providing an extension sleeve for receiving the screw, the cam, and a micrometer tube; the way in which a thimble is rotatably mounted on the micrometer tube and operably coupled with the screw; and many more minor aims and objects, all of which will be made clear as the following specification progresses.

Figure 1:
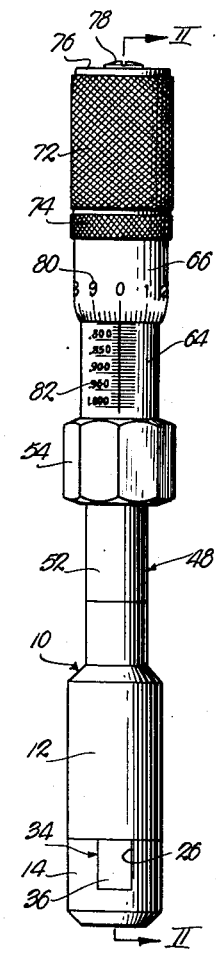
Fig. 1 is a side elevational view of an instrument for measuring inside dimensions made pursuant to my present invention.

In the form of the invention chosen for illustration there is included a gauge body broadly designated by the numeral 10 and including a hollow cylindrical portion 12 having the lowermost end thereof closed by a guide member 14 threaded thereinto. The body 10 includes additionally an elongated tubular portion 16 extending from portion 12 oppositely to member 14.

Figure 2:
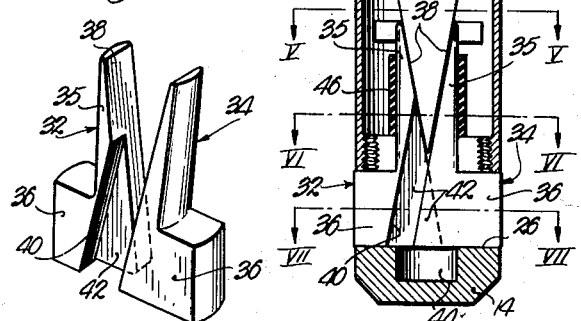
Fig. 2 is an enlarged longitudinal cross-sectional view taken on line II—II of Fig. 1.
Figure 3:
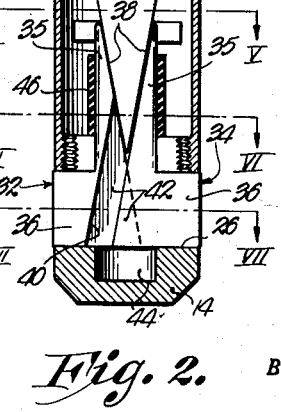
Fig. 3 is a perspective view of the gauge elements entirely removed from the gauge body.
Figure 4:
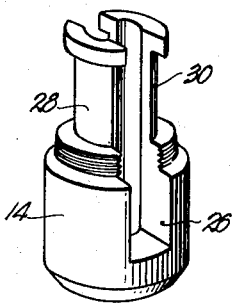
Fig. 4 is a perspective view of the guide member entirely removed from the gauge body.

A wedge-shaped cam 18 reciprocable within the body portion 12 has an elongated stem 20 extending through the tubular portion 16, and a spring 22, coiled about the stem 20 within the tubular portion 16, maintains the cam 18 yieldably biased at one end of its path of travel as shown in Fig. 2 of the drawing. The tension on spring 22 is determined by a bushing 24 threaded on the stem 20 and serving as an abutment for one end of the spring 22.

The guide member 14 is slotted to present a slideway 26 which also separates a pair of fingers 28 and 30 forming a part of the guide member 14 and housed within the body portion 12.

The slideway 26 receives a pair of L-shaped gauge elements 32 and 34 for relative sliding movement toward and away from each other. Elements 32 and 34 are identical and include an elongated leg 35, a feeler 36, an innermost face 38, a rabbet 40 and a tenon 42. The faces 38 are relatively inclined complementally with cam 18 and it is to be noted that the innermost edge of the tenons 42 constitute continuations of the face 38. The lowermost, flat faces of the members 32 and 34, and accordingly of the triangular shaped tenon 42, rest upon the bottom wall of the slideway 26 in the guide member 14.

The rabbets 40 are complemental to and of the same size as the tenons 42 to the end that each tenon 42 fits within a rabbet 40 when the elements 32 and 34 are together. It is seen further that virtue of the overlapped joint between the elements 32 and 34, tenons 42 are in interengagement for relative sliding movement.

The wedge cam 18 extends between the legs 35 of elements 32 and 34 and between the fingers 28 and 30 in the slideway 26 for spreading the elements 32 and 34 apart when the cam 18 is moved toward a clearance cavity 44 therefor in the guide member 14. Slideway 26, therefore, not only holds the elements 32 and 34 to rectilinear movement, but restrains the cam 18 against rotational movement relative to the gauge elements 32 and 34.

Means is provided within the body portion 12 for maintaining the elements 32 and 34 yieldably biased toward each other to thereby maintain the faces 38 thereof in sliding engagement with the inclined faces of cam 18. Such means comprises a tubular, resilient sleeve 46 telescoped around the fingers 28 and 30 and around the legs 35 of elements 32 and 34. Natural or synthetic rubber or similar elastic material is suitable for the sleeve 46.

An extension sleeve 48 that includes a pair of threadably connected sections 50 and 52 has the section 52 thereof threaded on the tubular portion 16 of body 10, and a nut-like enlargement 54, fitted on the extension 52, aids in the manipulation of the gauge. Section 50 has an elongated screw 56 threaded thereinto which terminates in an anvil 58 that bears against the proximal end of stem 20 which in turn projects beyond the bushing 24.

Section 50 is provided with a spring collet end 60 remote from section 52 upon which is threaded a tightening nut 62 for varying the tension of section 50 on the screw 56.

A micrometer tube 64 is tightly fitted on the section 50 and a tubular turning thimble 66 is rotatably telescoped over the tube 64. A frusto-conical socket 68 in the thimble 66 receives a similarly-shaped head 70 on the screw member 56, and a knurled collar 72 circumscribes the thimble 66 between a knurled annulus 74 on the thimble 66 and a cap 76 overlapping the thimble 66. A screw 78, passing through the cap 76 and into the screw member 56, clamps the collar 72 to the thimble 66 and rigidly interconnects thimble 66 and screw member 56 by drawing the head 70 tightly into the socket 68.

Micrometer scales are provided on the thimble 66 and on the tube 64 take the form of circumferential graduations 80 on thimble 66 and linear graduations 82 on the tube 64.

In use, collar 72, cap 76, screw 78, thimble 66, and screw member 56 are rotated as a unit in one direction relative to the section 50 and the tube 64 to move the anvil 58 toward the body portion 12 and thereby shift the stem 20, as well as the cam 18, toward the cavity 44 against the action of spring 22 until the feelers 36 come into engagement with the walls of an opening or the like to be measured. The size of the opening is reflected on the scale 80—82.

Figure 5:
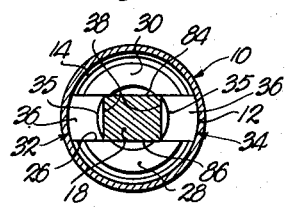
Fig. 5 is a cross-sectional view taken on line V—V of Fig. 2.
Figure 6:
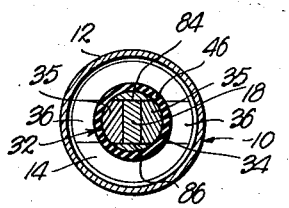
Fig. 6 is a cross-sectional view taken on line VI—VI of Fig. 2.
Figure 7:
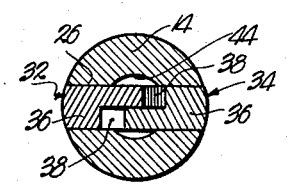
Fig. 7 is a cross-sectional view taken on line VII—VII of Fig. 2.

When the collar 72 is manipulated to retract the elements 32 and 34, spring 22 operates to return the wedge member 18 to the position shown in Fig. 2, and the rubber sleeve 46 acts to retract the elements 32 and 34 in the slideway 26 to the position shown in Figs. 1, 2, and 7. By virtue of the fact that the triangularly-shaped cam 18 is provided with a pair of opposed flat faces 84 and 86 as shown in Figs. 5 and 6, it is held in sliding engagement with the faces 38 and with the fingers 28 and 30 at all times and cannot possibly become misaligned or out of adjustment. The instrument as shown is easily assembled and disassambled for repair, lubrication or replacement of parts. It may be inexpensively manufactured and is appreciably less complicated than instruments of this class now available in the field, such simplicity being made possible without sacrificing accuracy or high precision. It can be made in any size including microscopic dimensions with equal accuracy.

It can now also be appreciated that the construction of the gauge is such as to permit substitution of an indicator dial in lieu of the microscopic scale chosen for illustration. The specially formed gauge elements 32 and 34 are also well suited for modification to adapt the instrument for measuring pitch diameter in threaded openings if desired. Finally, mounting of the elements 32 and 34 for right angle movement relative to the wedge 18 presents a principle of operation that may be applied wherever there is a need for high magnification of force or measurement.

Having thus described the invention, what is claimed as new and desired to be secured by Letters Patent is:

1. In a gauge, a body having a hollow portion; a guide member mounted on said portion of the body, said member having a pair of fingers extending into said portion of the body and provided with a slideway therebetween; a pair of L-shaped gauge elements in said slideway and movable toward and away from each other, said elements each having a feeler and an elongated leg, said legs being provided with relatively inclined, innermost faces; a reciprocable, wedge-shaped cam in said portion of the body between said legs for forcing the elements apart when the cam is moved in one direction; and a resilient sleeve surrounding the fingers and the legs for yieldably holding the legs biased toward each other with said faces of the legs engaging the cam.

2. In a gauge as set forth in claim 1 wherein said cam has a pair of opposed, flat faces, and wherein the cam extends into the slideway whereby the cam is held against rotational movement relative to the elements as the cam is reciprocated.

3. In a gauge as set forth in claim 1 wherein said elements ars provided with inter-engaging, relatively slidable parts, presenting an overlap joint therebetween.

4. In a gauge as set forth in claim 1 wherein said elements are each provided with a rabbet and a tenon, presenting an overlap joint between the elements, the tenons being in interengaging relationship and relatively slidable as the elements move toward and away from each other.

5. In a gauge as set forth in claim 4 wherein said rabbets and said tenons are triangular and complementary, whereby the tenon of each element is fittable in the rabbet of the other element when the elements are together.

6. In a gauge as set forth in claim 4 wherein one edge of the tenons constitutes a continuation of said innermost face of the elements.

7. In a gauge, a body having a hollow portion; a guide member mounted on said portion of the body, said member having a pair of fingers extending into said portion of the body and provided with a slideway therebetween; a pair of L-shaped gauge elements in said slideway and movable toward and away from each other, said elements each having a feeler and an elongated leg, said legs being provided with relatively inclined, innermost faces; a reciprocable, wedge-shaped cam in said portion of the body between said legs for forcing the elements apart when the cam is moved in one direction; resilient means yieldably holding the legs biased toward each other with said faces of the legs engaging the cam; a stem on the cam reciprocably carried by the body; spring means for yieldably holding the cam and stem biased in the opposite direction; and a reciprocable anvil bearing against the stem for moving the stem and cam in said one direction against the action of said spring means.

8. In a gauge as set forth in claim 7 wherein is provided an extension sleeve on the body for receiving said anvil, there being a screw on the anvil carried by the sleeve therewithin for reciprocating the anvil.

9. In a gauge as set forth in claim 8 wherein is provided means on said sleeve for varying the tension of the sleeve on the screw.

10. In a gauge as set forth in claim 8 wherein is provided a micrometer tube on the sleeve and a turning thimble on the tube and connected with the screw, there being associated micrometer scales on the thimble and on the tube respectively.

HANS RUDOLPH.

No references cited.